July 10, 1934.  C. G. LEIGH  1,965,658
COVER FASTENER
Filed Sept. 19, 1932   2 Sheets-Sheet 1
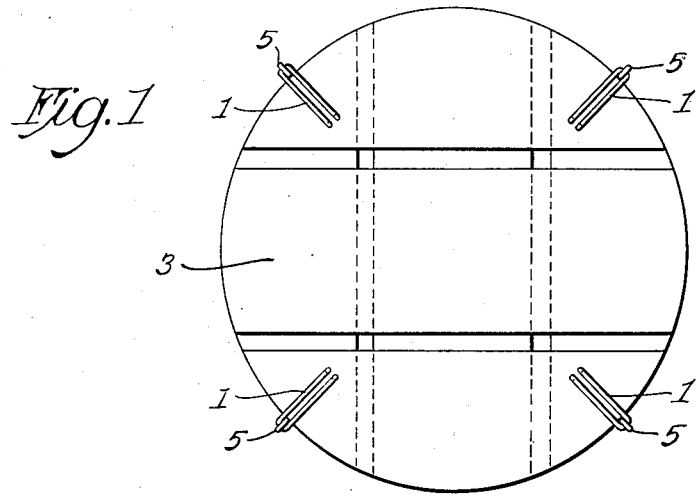
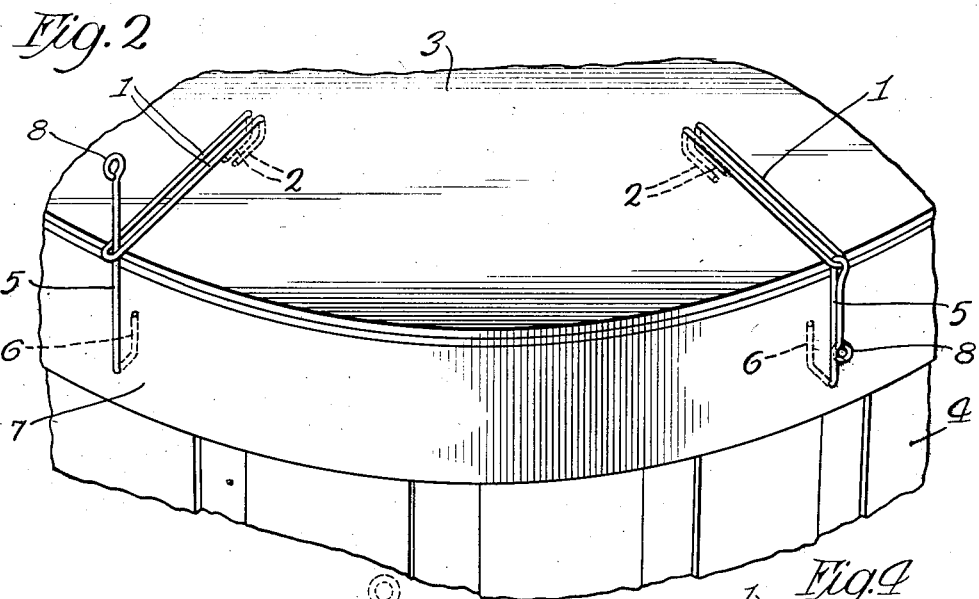
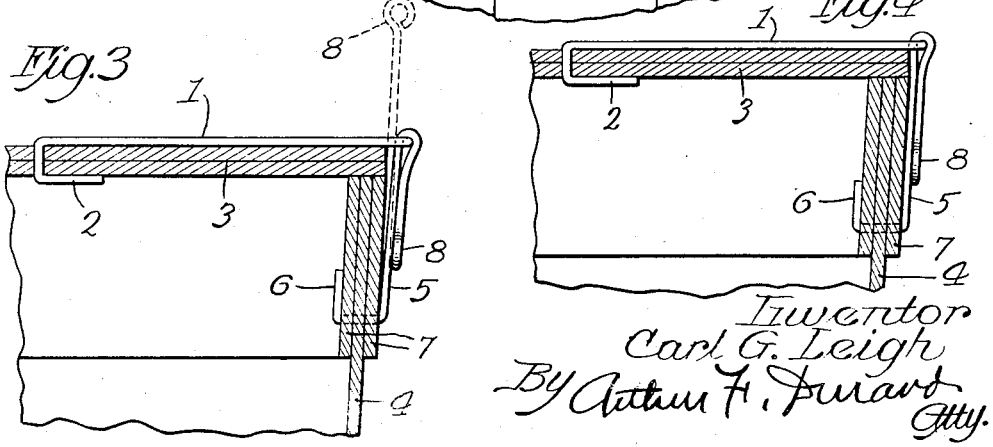
Inventor
Carl G. Leigh

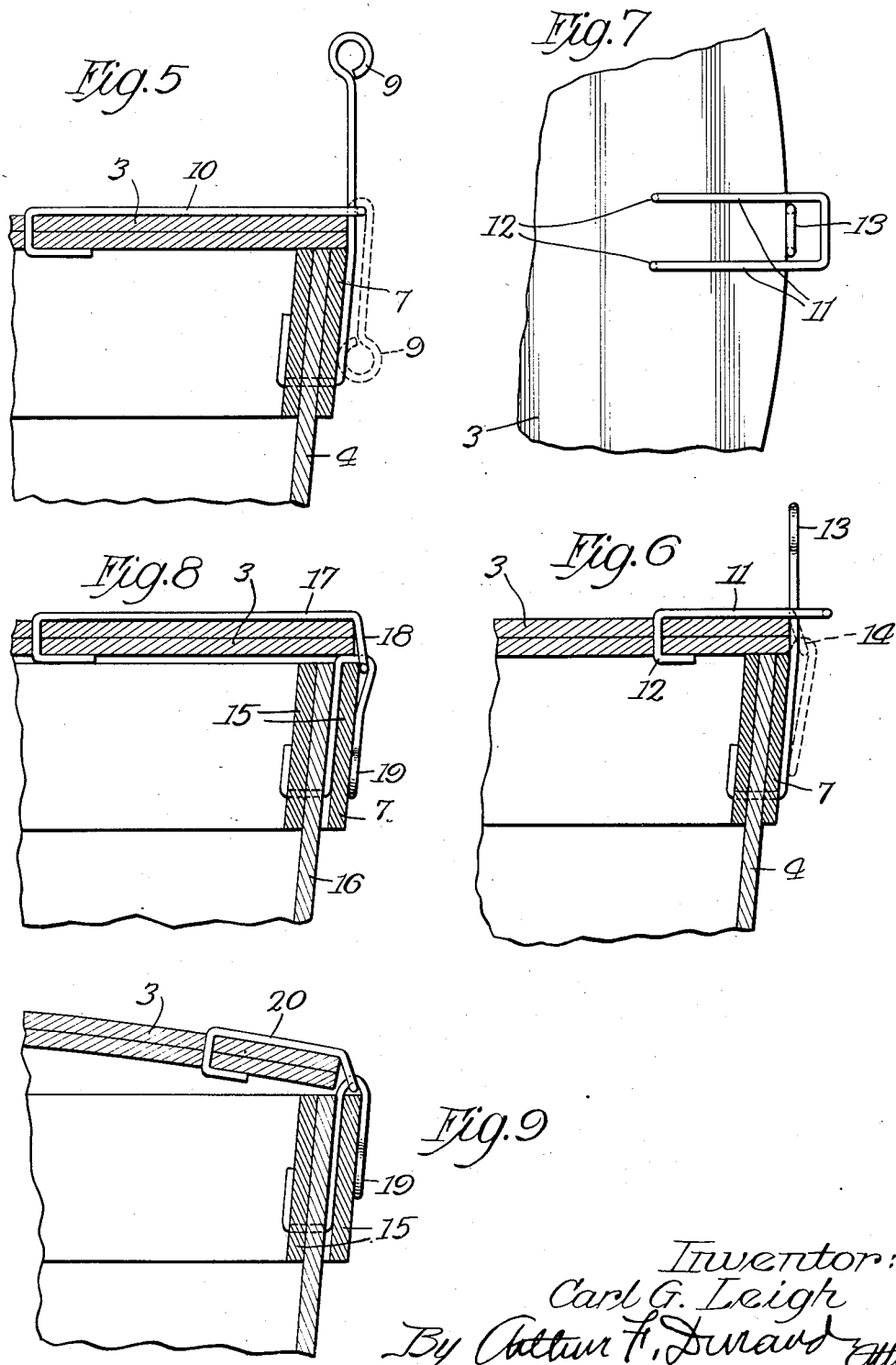

Patented July 10, 1934

1,965,658

UNITED STATES PATENT OFFICE 1,965,658

COVER FASTENER

Carl G. Leigh, Chicago, Ill., assignor to Leighway Fastener Company, Benton Harbor, Mich., a corporation of Michigan Application September 19, 1932, Serial No. 633,724

2 Claims. (Cl. 292—253)

This invention relates to basket cover fasteners, or fasteners for similar closures, and more particularly to baskets of this kind that involve interconnecting wire members that are secured, respectively, to the cover and the container body, whereby the cover may be easily and conveniently secured in place.

Generally stated, the object of the invention is to provide a novel and improved construction whereby one of the two interlocking members of each fastening device, preferably the member secured to the basket or body of the container, may be a single length of wire anchored at one end and provided at the other end with an enlargement, preferably in the form of a bent portion forming an eye, which latter can be used as a handle for insertion through the other or loop-like member, and which can then be used to bend the single length of wire into firm interlocking and cover-retaining position, but in such a manner that the single length of wire can be easily bent substantially straight again, when it is desired to remove the cover, thereby to permit ready disengagement of one wire member of the fastening device from the other wire member thereof.

It is also an object to provide certain details and features of construction tending to increase the general efficiency and the desirability of a wire cover or closure fastener of this particular character.

To the foregoing and other useful ends, the invention consists in matters hereinafter set forth and claimed and shown in the accompanying drawings, in which—

Fig. 1 is a plan view of a basket cover held in place on a basket by means of fastening devices involving the principles of the invention.

Fig. 2 is a perspective of a portion of said cover and basket, showing one fastening device in interlocking condition, securely holding the cover in place, and showing another and similar fastening device in condition to have one member thereof bent into said interlocking position.

Fig. 3 is a fragmentary or detail vertical section through a portion of the basket, on a larger scale, showing one of the fastening devices in final or interlocking and cover-retaining position.

Fig. 4 is a view similar to Fig. 3, showing a slightly different form of the invention.

Fig. 5 is a vertical fragmentary section showing a different form of the invention.

Fig. 6 is a similar view showing a different form of the invention.

Fig. 7 is a plan view of the structure shown in Fig. 6 of the drawings.

Fig. 8 is a similar vertical section showing a different form of the invention.

Fig. 9 is a similar sectional view showing a different form of the invention.

As thus illustrated, the invention comprises a loop-like wire member 1, preferably anchored by bent end portions 2 to the cover 3 of the basket 4, which latter may be an ordinary bushel or half-bushel basket, or any other similar or suitable container. The other member of the fastening device comprises a single length of wire 5, having its lower end anchored by a bent end portion 6 in the rim 7 of the basket, and having its upper end bent to form an eye 8 that will serve as a relatively wide handle. Thus the handle has only a single neck of fixed width, much narrower than the handle.

With this construction, when the cover is put in place, the enlargements or eyes or handles 8 of the single wire members 5 can be turned or twisted a little, so that they will be easily insertable upwardly through the loops or bail-shaped members 1, and these handle portions 8 can then be twisted back until they will be exactly crosswise of the members 1, and each single wire member can then be bent downwardly into the position shown at the right in Fig. 2, and into the position shown in Fig. 3 of the drawings, it being observed that for this purpose each member 1 extends slightly beyond the edge of the basket cover. When the single wire members 5 are bent downwardly in this manner, the heads or handles 8 rest flatwise against the shank or body portion of each single wire member at points below the cover 3, and the latter is securely held in place.

Thereafter, when it is desired to remove the cover, the single wire members 5 are bent upwardly into approximately their original positions, so that they will stand upright, and by twisting the heads or handles 8 a little, the cover can then be lifted upwardly and the heads or handles 8 will readily pass through the narrow spaces of the bail-shaped or loop-like members 1, thereby permitting the latter to be disengaged from the members 5, in order to uncover the contents of the basket.

It will be understood, of course, that the members 1 can be fastened to the covers, in the manufacture of the latter, and that the members 5 can be fastened to the rims of the baskets, in the manufacture of the latter, whereby the baskets and their covers will come to the consumers or users with the fasteners properly attached thereto.

Of course, the wire employed for the members 1 and 5 should be of suitable flexibility, particularly the members 5, to permit the bending thereof in the manner explained, but the wire should be of sufficient stiffness to retain itself in the bent condition necessary for securing the cover in place. In this connection, it will be seen that the anchoring portions 2 are preferably some distance from the edge of the cover, so that the loop-like members 1 are preferably of substantial length, whereby the overhang of these members 1 may be very slight, perhaps too slight to permit upward insertion of the heads or handles 8 therethrough, except as the members 1 are first slightly swung upwardly from the top surface of the cover, so that the members 5 can be bent slightly inwardly at their upper ends in order to pass upwardly through the bail-shaped members 1 on the cover. In Fig. 3, the proportions are such, it will be seen, that the heads or handles 8, shown in dotted lines in their vertical position, may pass upwardly through the loops or bail-shaped members 1, in such a manner that when the heads or handles 8 are then bent downwardly, the shanks of the members 5 will move a little away from the sides of the basket rim. But in Fig. 4 the overhang of the member 1 is so slight, at the edge of the cover, as will be seen, that the head or handle 8 must be bent inwardly of the basket, and that the member 1 must be swung upwardly at its outer end, in order to interlock the two members in the desired manner, and with this construction the shank of the member 5 will remain tight against the outer surface of the rim of the basket, and there will be no overhanging end portion of the member 1 that will be susceptible of appreciable downward bending when the two members of the fastner are in final interlocked condition. In other words, in Fig. 3 of the drawings, the overhanging end portion of the member 1 might bend down a little, when the member 5 is bent down at its upper end; but in Fig. 4, the proportions are such, as explained and as shown, that the end of the loop member will not be likely to be bent down appreciably when the single wire member is bent down and pulled taut in a downward direction in the desired manner.

By using the single length of wire for the members 5, less wire is employed, of course, and a considerable saving in the cost of manufacture is effected. Obviously, of course, in this connection the parallel sides of the members 1 can be far enough apart to permit upward passage of the heads or handles 8 therethrough, if desired, without the necessity of twisting or turning these handles in the manner explained. But, of course, it will be seen that with a single length of wire for the member 5, bearing against the loop-like outer end of the other member, the tendency is to pull the two side portions of the member 1 close together, when the member 5 is pulled outwardly and bent down with some force. This, if there was considerable space between the sides of the member 1, would result in a sort of outward lengthening of each member 1, with a resulting greater tendency of each member 1 to bend downwardly at its outer end. And, therefore, each member 1 is preferably just wide enough to allow the head or handle 8 of the other member to pass edgewise therethrough, when the head or handle is twisted a little in the manner explained, and with this construction the sides of each member 5 are tightly gripped by the two side portions of each member 1, in the final and forcible bending and interlocking of the two members of each wire fastening device thus provided to hold the basket cover in place.

Of course, when it is desired to open the basket or other container, the heads or handles 8 are then bent upwardly, as indicated in dotted lines in Fig. 3 of the drawings, and it is obvious that by some manipulation the heads or handles 8 can then be relatively passed downwardly through the loops or bail-shaped members 1, as by pulling each of the latter upwardly and out of engagement with its allotted single wire member, and the cover can then be removed to permit access to the contents of the basket.

In Fig. 5 of the drawings the handle 9 of the single wire strand member fastened to the basket, is turned edgewise, parallel with the loop member 10, in the normal condition of said handle, whereby it is not necessary to twist this handle from its original position, in order to have it pass upwardly through the loop member. In such case, the handle is bent down, after being passed up through the loop member, as shown in dotted lines, and bears edgewise against the side of the basket, and the handle may then be twisted to bear flatwise against the basket loop 7, if desired.

In Figs. 6 and 7 of the drawings, the loop member 11 is similar to that previously described, but is fastened to the basket cover at points 12 much closer to the edge of the cover, than in the structures previously described. Also, in this case, the loop member 11 is wider than the head or handle 13 of the single strand member fastened to the basket, so that said head or handle may normally stand crosswise of the loop member, and at the same time be free to pass upwardly through the loop member. Also, in this case, the loop member projects far enough so that it is bent down, as shown in dotted lines at 14 in Fig. 6, when the single strand wire member is pulled taut and bent down in the manner shown. Obviously, the tension will tend to draw the sides of the member 11 toward each other, so that the handle 13 could not pull through the loop and release the cover.

In Fig. 8 of the drawings the single strand wire member is inserted between the hoops 15 of the basket, between the outer hoop and the veneer side wall 16 of the basket, and in addition the loop member 17 extends a substantial distance beyond the edge of the basket cover, so that the end portion 18 of this loop member is bent down as shown, when the handle or head portion 19 of the member thus fastened to the basket is pulled taut and bent down in the manner shown.

In Fig. 9 the construction is similar to that shown in Fig. 8, but in this case the loop member 20 is substantially shorter, and in addition the cover is shown in an upwardly bulged condition, as is common in the use of bushel and half-bushel baskets, when the fruit or other commodity is overpacked therein. In such case, the contents of the basket extends upwardly above the rim of the basket, and when the wire devices are pulled taut and bent down, in fastening the edges of the cover in place, the cover itself will bulge and become convex on its upper side, so that the relation between the edge portion of the cover and the rim of the basket will be as shown in Fig. 9 of the drawings, when the wire fastening device is pulled taut, after pressing the edge of the cover downwardly as far as possible, and after then firmly bending the wire in fastening position.

Thus it will be seen that the loop member which is fastened to the cover may be either long or short, depending upon the requirements of different cases, and the particular form to be employed for the invention. By shortening the loop member, less wire is employed, and a saving in the cost of production is effected. Also, by using a single strand of wire for the fastening member secured to the basket, it is not only true that less wire is employed, but it is also true that machinery can be used to greater advantage, in the production of these wire devices, as the single strand members can be made much more rapidly by machinery, than if they were double or composed of two parallel portions of wire. As shown in Fig. 5, and as shown in Figs. 6 and 7, the relative formation of the loop member and the single strand member is such that the handle or head of the latter does not have to be twisted, either in assembling the cover in place, or in removing the cover, as in each case the relative formation is such that the head or handle may be passed readily upward or downward through the loop member, while the said head or handle is in its normal or original position. But it is also possible, as previously explained, to employ a narrow loop member of such width, and a head or handle normally transverse thereof, whereby the head or handle must be twisted slightly from its normal condition, in order to enable it to pass upward or downward through the loop member. If the head or handle is wider than the slot or space in the loop member, it follows that the basket cover could be forced off or partly open, without danger of being entirely detached from the basket, inasmuch as the heads or handles of the single strand wire members would not pass through the loop members. However, if it is not desired to employ the feature of twisting or partially turning the head or handle, the loop member can be wide enough to pass the head or handle therethrough, even with the head or handle extending crosswise or transversely of the loop member. But in each form of the invention the relatively wide handle 7 or 9 or 13 has only a single narrow neck formed by the single wire.

It will be seen that when the loops on the cover are made quite narrow, and just wide enough to receive the single wire members on the basket, the cover is more effectively held against displacement, thereby preventing chaffing or rubbing of the fruit in the basket.

Because the single wire members on the sides of the basket can be bent laterally as easily as away from the basket, it follows that these single wire members can be adjusted easily for insertion through the loops, and may be bent down vertically or to either side. Also, these single wire members are more easily straightened up when bent by nesting of the baskets.

Thus it will be seen that in each form of the invention the handle 8, or the handle 9, or the handle 13, or the handle 19, may be twisted around lengthwise of the loop, in order to take the cover off, as in each form of the invention the sides of the loop will draw toward each other, more or less under the strain of the load, when the cover is tightly fastened down, so that the loop will be too narrow to permit the handle to pass upwardly therethrough, except as the handle is turned or twisted lengthwise of the loop. Also, in some forms of the invention, as in Fig. 2, the handle must be turned or twisted before it can pass upwardly through the loop, and while the handle can be bent down edgewise against the basket hoop, it is preferable to bend the handle flatwise against the outer side of the hoop. Therefore, with the sides of the loop drawn together, more or less, under the tension, and with the flexible member provided with an enlargement or handle, as set forth and shown, there is less danger of unintentional removal of the cover, as the handle cannot pull through the loop. In this way, the width of the loop, when the cover is finally in place, is of such size as to prevent the passage therethrough of the enlarged portion or handle of the flexible member, except when the latter is twisted to present the enlarged dimension thereof to the length of the loop, whereby unintentional removal of the separable portion of the structure is prevented.

What I claim as my invention is:

1. In cover or closure fasteners for containers, the combination of a bail-shaped wire member in effect forming a loop with its ends anchored in position on the structure, and an elongated flexible member having one end thereof attached to another separable portion of the structure and adapted to pass through said loop, said flexible member having a portion enlarged in one dimension transversely of its length adjacent the free end thereof to provide a handle, the width of the loop when the cover is finally in place being of such size as to prevent the passage therethrough of the enlarged portion forming said handle of the flexible member except when the latter is twisted to present the enlarged dimension thereof to the length of the loop, whereby unintentional removal of the separable portion of the structure is prevented.

2. In a fastener for the cover of a basket of the type provided with a body including side walls and a pair of hoops secured to the side walls adjacent the upper portion of the latter, the combination with a bail-shaped member in effect forming a loop with its ends anchored in position on the cover, of an elongated flexible member secured at one end to the basket body and adapted to pass through said loop, said flexible member having a portion enlarged in one dimension transversely of its length adjacent the free end thereof to provide a handle, the width of the loop when the cover is finally in place being of such size as to prevent the passage therethrough of the enlarged portion forming said handle of the flexible member except when the latter is twisted to present the enlarged dimension thereof to the length of the loop, whereby unintentional removal of the cover is prevented, said flexible member extending downwardly between the pair of hoops and having its lower end extending inwardly through the inner hoop.

CARL G. LEIGH.